Oct. 15, 1940.  C. J. HUGHEY  2,218,241
DOUBLE EXPOSURE PREVENTION DEVICE
Filed Aug. 12, 1939
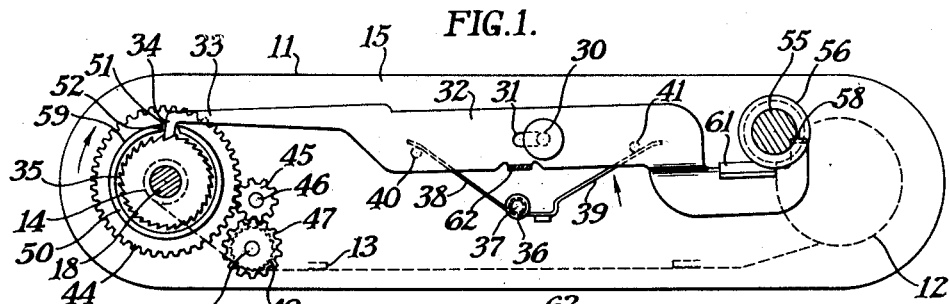
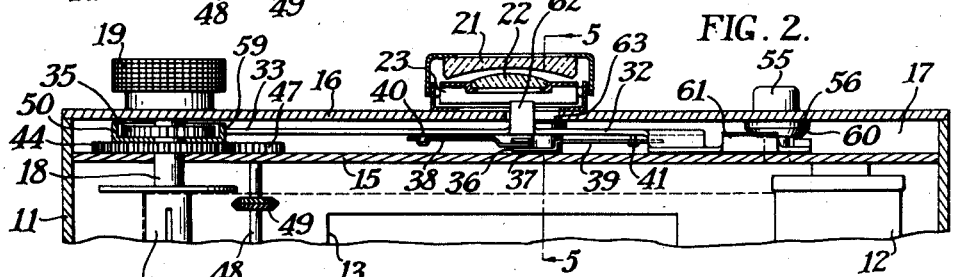
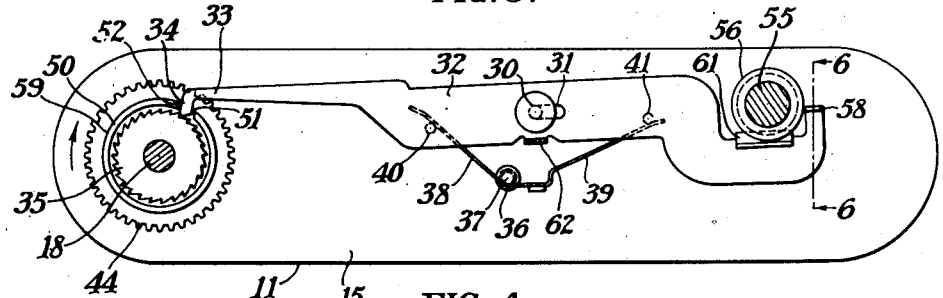
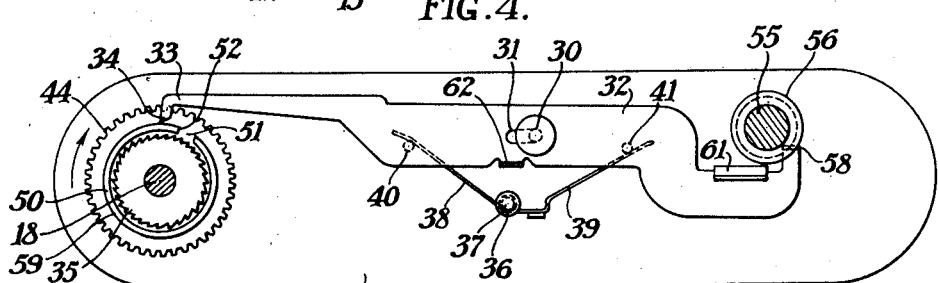
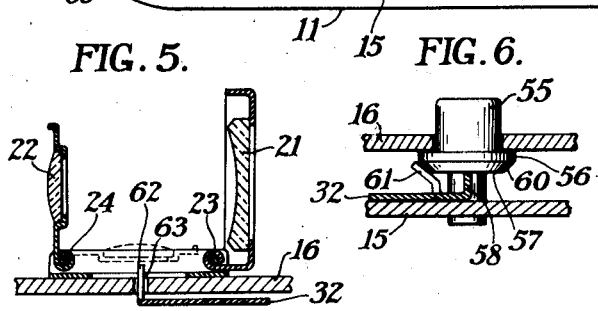
CARTER J. HUGHEY
INVENTOR
BY
ATTORNEYS Patented Oct. 15, 1940

2,218,241

UNITED STATES PATENT OFFICE 2,218,241

DOUBLE EXPOSURE PREVENTION DEVICE

Carter J. Hughey, Rochester, N. Y., assignor to Eastman Kodak Company, Rochester, N. Y., a corporation of New Jersey Application August 12, 1939, Serial No. 289,882

10 Claims. (Cl. 95—31)

The present invention relates to photography, and more particularly to the prevention of a double exposure in roll holding cameras.

One object of the invention is the provision of a camera with a film winding mechanism and a shutter actuating mechanism which are so interconnected that the mechanisms can normally be operated only in proper sequence so as to thereby prevent the making of a double exposure, or the winding up of an unexposed portion of the film strip.

Another object of the invention is the provision on a camera of the class described of a double exposure prevention device which is normally positioned to prevent the inadvertent making of a double exposure, but which may be selectively movable to an inoperative position to permit a deliberate second actuation of the shutter mechanism prior to the moving of the film strip so as to enable a double exposure to be made.

A further object of the invention is the provision of a mechanism which normally functions to prevent the making of a double exposure, but which may be manually positioned to permit the deliberate making of such a double exposure, and, at the completion of a double exposure, automatically returns to its operative position in which further double exposures are effectively prevented.

Still another object of the invention is the provision of a mechanism of the class described which is simple in construction, relatively inexpensive to manufacture, highly effective in use, and which may be applied to existing cameras with only slight alterations of the parts thereof.

To these and other ends, the invention resides in certain improvements and combinations of parts all as will be hereinafter more fully described, the novel features being pointed out in the claims at the end of the specification.

In the drawing:

Fig. 1 is a plan view of a roll film camera, with the top plate removed, showing the relation thereto of a double exposure prevention device constructed in accordance with the preferred embodiment of the invention;

Fig. 2 is a vertical sectional view through a portion of the camera illustrated in Fig. 1, showing the various camera parts, and the relation thereto of the double exposure prevention device of the present invention;

Fig. 3 is a view similar to Fig. 1, but with the parts in a slightly different position in which the film winding mechanism is locked against further operation, and the shutter actuating mechanism is released so that it can be actuated to make an exposure;

Fig. 4 is a view similar to Figs. 1 and 3, but showing the relation of the various parts after the actuation of the shutter trigger to make the exposure;

Fig. 5 is a vertical sectional view through the camera and the view finder, and taken substantially on line 5—5 of Fig. 1, showing the relation to the finder of a mechanism for moving the double exposure prevention device to an inoperative position to permit the deliberate making of a double exposure; and Fig. 6 is a vertical sectional view through a portion of the camera, and taken substantially on line 6—6 of Fig. 3, showing the arrangement by which the shutter actuating mechanism is locked against a second operation, and the arrangement by which a shutter trigger operates the pivoted lever to release the film winding mechanism.

Similar reference numerals throughout the various views indicate the same parts.

The present invention relates to a roll film camera in which both the winding knob for the film winding mechanism, and the shutter actuating trigger are positioned on the camera body. The film winding mechanism and the shutter trigger are so interconnected that upon completion of the film winding or moving operation, the film winding mechanism is positively locked against further movement and the shutter trigger is released. The actuation of the shutter trigger to make an exposure then serves to move the interconnecting mechanism to unlock or release the film winding mechanism and to simultaneously lock the shutter trigger against a second actuation. The subsequent winding of the film again locks the winding mechanism and releases the shutter trigger.

By means of this interconnection, the winding mechanism and the shutter trigger are alternately locked so that one cannot be actuated a second time until the other has been previously operated so as to thus prevent both the making of a double exposure on a single film area and to also effectively prevent the winding up of a film area which has not been exposed. In addition, the present invention provides a novel and simple, yet highly effective arrangement by which the interconnecting mechanism may be deliberately rendered ineffective so as to permit the making of a double exposure when desired. At the completion of the double exposure, the interconnecting mechanism automatically returns to its normal position to prevent any inadvertent double exposure or film winding, all as will be hereinafter more fully described.

The present invention is embodied in the present instance in a roll film camera having a body portion 11 in one end of which is positioned a roll or retort 12 which carries a supply of unexposed film which is drawn across the camera and over the exposure frame 13 and is finally wound up on the takeup spool 14. The top of the camera body 11 is provided with a pair of spaced walls or plates 15 and 16 which form a mechanism chamber 17 which houses a double exposure prevention device to be later described. A winding spindle 18 extends through and is journaled in the plates 15 and 16 and is operatively connected to the takeup spool 14 in the usual well-known manner so that the rotation of the spindle 18 serves to rotate the takeup spool 14 to wind the exposed film thereon and to simultaneously draw an unexposed portion of the film strip from the supply roll 12 and to position the unexposed film across the exposure frame 13, all of which is well known to those in the art.

The spindle 18 projects above the plate 15 and has secured thereto a winding knob 19 for rotating the spindle, as is well known. The camera body also carries a shutter trigger 55 which is positioned at the opposite end of the camera body from the winding knob 19 and is suitably connected to the camera shutter so that upon depressing the trigger the shutter is operated to make an exposure. The trigger thus constitutes a part of the shutter actuating mechanism. The camera body also has positioned thereon a direct vision view finder which comprises a pair of spaced lens members 21 and 22 which are mounted in suitable frames pivoted on the camera body at 23 and 24 respectively so that the lenses may be moved to the operative position shown in Fig. 5, or may be folded or collapsed into an inoperative position shown in Fig. 2.

In many modern cameras the usual and well-known red observation window in the camera back is omitted, so that it is necessary to provide a suitable arrangement for automatically locking the film winding mechanism when exposed film has been wound onto the takeup spool, and when a fresh or unexposed film portion has been moved into exposing position. In the present invention this locking device is operatively, broadly, connected to the shutter actuating mechanism so that the operation of the latter to make the exposure serves to move the device out of locking engagement with the winding mechanism, and to simultaneously lock the shutter against a second actuation. The subsequent winding of the exposed film again positions the device to lock the film winding mechanism and to also release the shutter actuating mechanism. By means of this arrangement, the film winding and shutter actuating mechanisms are alternately locked to effectively prevent the making of a double exposure and to eliminate the winding up of unexposed film portions.

To secure these desirable results, the lower partition plate 15 is provided with a stud 30 which is arranged to extend through a slot 31 of a lever 32, of the shape best shown in Figs. 1, 3, and 4. The stud 30 and slot 31 provide a pivotal and slidable support for the lever 32, the purpose of which construction will be later pointed out. The left end 33 of the lever 32 is formed to provide a pawl 34 adapted to engage a ratchet 35 secured to and rotatable with the spindle 18. A spring 36 is wrapped around a pin 37 on the plate 15 and has the opposite ends 38 and 39 thereof arranged to engage pins 40 and 41 secured to or formed from the material of the lever 32, and positioned on opposite sides of the slot 31, as is clearly shown in Figs. 1, 3, and 4. The spring 36 tends to turn or pivot the lever 32 in a counterclockwise direction about the stud 30 to move the pawl 34 into engagement with the ratchet 35 to lock the film winding mechanism against further movement.

It is apparent that when the pawl 34 engages the ratchet 35, the rotation of the latter, and hence the spindle 18, will be arrested to prevent further winding of the film strip. In order that this locking of the winding mechanism will occur only at the completion of the film winding or moving operation, obviously means must be provided for preventing the engagement of the pawl with the ratchet until such time as the exposed film has been completely wound onto the takeup spool and the new or unexposed film area is in exposing position. In other words, the locking of the film winding mechanism must be in proper timed relation to the movement of the film strip across the camera.

To secure this timed relation of the locking means, the present invention provides a gear 44 which is loosely mounted on the spindle 18 below the ratchet 35, as best shown in Fig. 2. This gear 44 meshes with the gear 45 rotatably mounted on a spindle or stub shaft 46 on the plate 15. The gear 45, in turn, engages a gear 47 secured to one end of a measuring roll shaft 48 which projects through the plate 15 and extends across the camera body, and has secured thereto a pair of pointed film measuring rollers 49, only one of which is shown, which engages the moving film strip so as to be driven thereby. By means of this arrangement, the gear 44 is driven from the measuring rollers 49 and in timed relation to the movement of the film strip. The gears 44, 45, and 47 are so proportioned that the gear 44 makes one revolution during the movement of the film strip a distance of one image area. As the measuring rollers 49 directly engage and are driven by the moving film strip, and, in turn, control the gear 44; and, as the windup knob 19 and spindle 18 serve to move the film, the measuring rollers 49 may be broadly considered as a part of the windup mechanism so that the gear 44 may be broadly designated as controlled by such mechanism.

The gear 44 has secured thereto or formed integral therewith an annular disk or ring 50 which is formed with a radial slot 52. This ring is so positioned that when the gear 44 is rotated, the slot 52 will register with the pawl 34 near the end of the film winding operation. When the slot 52 is thus brought into registry with the pawl 34, the latter is moved inwardly through the slot, by reason of the spring 36, and into engagement with the ratchet 35, as clearly shown in Fig. 1. Although the pawl now engages the ratchet, the parts are not yet locked as the lever 32 may still move to the right, as viewed in Fig. 1, by reason of the pin and slot connection 30 and 31. After the pawl engages the ratchet, as viewed in Fig. 1, the spindle 18 is rotated in a clockwise direction to move the parts from the position shown in Fig. 1 to that shown in Fig. 3. During this latter movement, an edge 52 of the slot 51 engages the side of the pawl 34 to slide the lever 32 longitudinally to the right to bring the stud 30 to the left end of the slot 31 in the lever 32. Upon reaching this position, the lever 32 is held against further rightward movement. As the lever is thus held, the ratchet 35 is correspondingly locked and the film winding mechanism is held against further rotation. This locking is accomplished at the completion of the film winding operation. This arrangement eliminates the necessity of the operator looking through a red window in the back of the camera. All the operator has to do is to turn the winding knob 19 and when the film strip has been properly positioned, the parts will be in the position shown in Fig. 3, and the winding mechanism will be automatically locked against further movement.

The shutter operating trigger 55 is mounted on the opposite end of the camera body from the winding knob 19, see Figs. 1 to 4. This trigger is connected to the camera shutter, and constitutes a part of the actuating mechanism therefor. However, as the particular arrangement for connecting the shutter trigger 55 to the shutter does not constitute a part of the present invention, a showing thereof is not deemed necessary to the full understanding of the present invention.

The trigger 55 extends upwardly through the mechanism chamber 17 which houses the lever 32 and the gears 44, 45, and 47, see Fig. 2, to provide an operating portion which projects exteriorly of the camera, as shown in Fig. 2. The portion of the trigger in the chamber 17 has mounted thereon a ring or flange 56 the bottom of which forms a shoulder 57 adapted to engage a lug 58 formed on the right end of the lever 32. This lug 58 is arranged to be positioned under the shoulder 57 when the lever 32 is slid to the left, as shown in Fig. 4 and to be later described. In this position, the lug 58 prevents a downward movement of the trigger 55 and hence the actuation thereof, as will be apparent from an inspection of Fig. 6. When the shutter trigger is thus locked, the lever 32 is in the position shown in Fig. 4 in which the pawl 34 is now out of engagement with the ratchet 35 and rides on the outer surface or periphery 59 of the ring 50 so as to free or release the film winding mechanism.

The knob 19 and the spindle 18 may now be rotated in a clockwise direction to wind the film. The winding of the film serves to rotate the measuring rollers 49, and, through the gears 44, 45, and 47, the annular ring 50, the movement of the latter being in proper proportion to and in timed relation with the film movement, as is apparent. When, however, the slot 51 of the ring 50 registers with the pawl 34, the latter is moved inwardly, under the action of the spring 36, through the slot 51 and into engagement with the ratchet 35, as above described. The rotation of the knob is then continued slightly to move the parts to the position shown in Fig. 3, at which time the film winding mechanism is locked, as has already been pointed out. However, when the parts are moved from a position shown in Fig. 1 to that shown in Fig. 3, the lever 32 is slid longitudinally to the right to move the lug 58 from under the shoulder 57, as shown in Fig. 3. The removal of the lug 58 from the path of the shutter trigger frees the latter so that it may be actuated to make an exposure. Thus, the locking of the film winding mechanism simultaneously unlocks or releases the shutter trigger to permit the operation thereof.

The trigger 55 is now depressed or moved downwardly, as shown in Fig. 2, to operate the shutter mechanism to make an exposure. This downward movement of the trigger serves to bring an inclined portion 60 of the flange 56 into engagement with an inclined member or cam 61 formed on the lever 32 adjacent the right end thereof, as shown in Figs. 1, 3, 4, and 6. The engagement of the portion 60 with the cam 61 serves to pivot the lever 32 in a clockwise direction about the stud 30 to move the pawl 34 radially outwardly through the slot 51 of the ring 50, and out of engagement with the ratchet 54. The parts will remain in this position as long as the shutter trigger is held in a depressed position. Upon release of the trigger, however, the spring 36 now acts on the pins 40 and 41 to shift or slide the lever 32 longitudinally to the left to move the pawl 34 out of registry with the slot 51, and to also turn or pivot the lever 32 in a counterclockwise direction about the stud 30 to bring the pawl into engagement with the outer surface 59 of the ring 51, all as shown in Fig. 4. During this leftward movement of the lever 32, the lug 58 is again moved under and into the path of the shoulder 57 to prevent a second actuation of the shutter trigger. Thus, the operation of the latter to make an exposure not only serves to release the film winding mechanism, but also simultaneously lock the shutter mechanism against further actuation until the film has been again wound.

The above described mechanism thus provides a device in which the film winding and shutter actuating mechanisms are alternately locked to prevent the making of a double exposure and to eliminate the winding of an unexposed film area. Furthermore, the actuation of one of the mechanisms automatically locks that mechanism and releases the other. While such a device positively and effectively prevents the making of a double exposure, it is sometimes desirable to deliberately make such a double exposure so as to secure certain desirable photographic effects. To this end the present invention provides an arrangement by which the above described double exposure prevention device may be temporarily moved to an inoperative or ineffective position to permit a second actuation of the shutter trigger prior to the winding of the film so as to permit the making of a double exposure.

Fig. 4 shows the position of the parts after the shutter has been actuated to make an exposure. At this time, the shutter is locked against a second actuation and the film winding mechanism is released so that the exposed film may now be wound up onto the takeup spool 14. It is now apparent from an inspection of Fig. 4, that if the lever 32 could be slid to the right, the lug 58 would be moved from under the shoulder 57, at which time, the pawl 34 would then register with the slot 51. The spring 36 would then pivot the lever 32 to move the pawl 34 inwardly through the slot 51 and into engagement with the ratchet 35, as above described. Thus the mere moving of the lever 32 to the right would again put the parts in the position shown in Fig. 3 in which the shutter trigger 55 would be released. However, since the film area which has been previously exposed has not been wound, a second actuation of the freed shutter trigger will cause a double exposure on the film area.

In order to permit the deliberate making of such a double exposure, the present invention provides a simple, yet highly effective, means for sliding the lever 32 to the right independently of the film winding mechanism. To secure this result, the lever 32 has a portion thereof bent up to form a lug or finger-piece 62 which extends through a registering opening 63 in the camera body 11, as best shown in Figs. 2 and 5. This finger-piece thus provides a ready means for moving the lever 32 from the position shown in Fig. 4 to that shown in Fig. 3 to release the shutter trigger to permit the deliberate making of a double exposure. This finger-piece extends upwardly through the camera body below the view finder and between the lenses 21 and 22 thereof, as shown in Fig. 5. Thus the finger-piece is readily accessible when desired, yet is so positioned that it will not be accidentally moved. When the finder is folded, as shown in Fig. 2, the finger-piece is effectively covered so that it cannot be actuated.

From the above description, it is apparent that by shifting the finger-piece 62 to the right, the lever 32 will be correspondingly shifted from the position shown in Fig. 4 to that shown in Fig. 3, as pointed out above. As the parts will now be in the position illustrated in Fig. 3, the shutter trigger will be released so that it may be again actuated; but, since the film has not been wound, such an actuation will make a double exposure on the film area positioned across the exposure frame 13. At the completion of this double exposure, the parts will be automatically turned to the position shown in Fig. 4 to free the film winding mechanism and to lock the shutter trigger so that the exposed film may be wound. In other words, the above described mechanism is effected to normally prevent the making of a double exposure, but may be selectively repositioned to enable such a double exposure to be made, and, after such a double exposure, will be automatically turned to its operative position in which further double exposures will be prevented until the parts are again manually repositioned. The mechanism for enabling such a double exposure to be made, when desired, is simple, effective, and is so positioned that it will not be inadvertently actuated, yet may be readily moved when desired.

While one embodiment of the invention has been disclosed, it is to be understood that the inventive idea may be carried out in a number of ways. This application is, therefore, not to be limited to the precise details disclosed, but is intended to cover all variations and modifications thereof which fall within the spirit of the invention or the scope of the appended claims.

I claim:

1. In a roll film camera, the combination with a camera body, of a film winding mechanism including a winding spindle for moving a film strip across said camera, a ratchet carried by said spindle, an annular member loosely mounted on said spindle and formed with a radial slot, a film measuring roll, means for operatively connecting said roll to said member so that the latter will be controlled in timed relation to the movement of said strip, a lever pivotally and slidably mounted on said body, a pawl formed on said lever and arranged to be moved through said slot and into engagement with said ratchet to lock said mechanism, a shutter trigger mounted on said body, said lever having a portion thereof positioned in the path of said trigger so that the operation of the latter serves to pivot said lever to move said pawl through said slot and out of engagement with said ratchet to free said mechanism, and means for moving said pawl out of registry with said slot and for moving said lever into locking engagement with said trigger.

2. In a roll film camera, the combination with a camera body of a film winding mechanism including a winding spindle for moving a film strip across said camera, a ratchet carried by said spindle, an annular member loosely mounted on said spindle and formed with a radial slot, a film measuring roll, means for operatively connecting said roll to said member so that the latter will be controlled in timed relation to the movement of said strip, a lever pivotally and slidably mounted on said body, a pawl formed on one end of said lever and a lug formed on the other end thereof, a shutter trigger on said body, said lug being positioned under said trigger to prevent operation thereof, said winding mechanism being movable to bring said slot into registry with said pawl substantially at the completion of the film moving operation, spring means for pivoting said lever to move said pawl inwardly through said registering slot and into engagement with said ratchet, means on said member for sliding said lever in one direction to move said lug out of locking engagement with said trigger to free the latter as said pawl is moved into locking engagement with said ratchet, and a cam movable into the path of said trigger when said lever is moved in said one direction, said cam being engageable by said trigger when the latter is actuated to pivot said lever to move said pawl outwardly through said slot and out of locking engagement with said pawl, said spring then sliding said lever in the opposite direction to move said pawl out of registry with said slot and to simultaneously move said lug into the path of said trigger to lock the latter against further operation.

3. In a roll film camera, the combination with a camera body, of a film winding mechanism including a winding spindle for moving a film strip across said camera, a ratchet carried by said spindle, a ring loosely mounted on said spindle concentrically with said ratchet and formed with a radial slot, a film measuring roll, means for connecting said roll to said ring so that the latter will be operated and controlled in timed relation to the movement of said strip, a lever mounted for longitudinal and pivotal movement on said body, a pawl formed on one end of said lever, said slot being arranged to be positioned in registry with said pawl substantially at the completion of the film moving operation, a spring mounted on said body and engaging said lever to pivot the latter to move said pawl inwardly through said slot and into engagement with said ratchet, a shoulder on said trigger, a lug formed on the other end of said lever and positioned under said shoulder to prevent operation of said trigger, said mechanism being capable of slight rotative movement subsequent to the engagement of said pawl with said ratchet to bring an edge of said slot into engagement with said pawl to slide said lever longitudinally in one direction to disengage said lug from said shoulder, means for limiting the movement of said lever to effectively lock the winding mechanism against further movement, and cooperating cam members on said lever and said shutter so that upon operation of the latter the lever is pivoted to move said pawl outwardly through said slot and out of engagement with said ratchet, said spring then serving to slide said lever in the opposite direction to move said pawl out of registry with said slot and to simultaneously move said lug under said shoulder to lock said trigger against a second operation.

4. In a roll film camera, the combination with a camera body, of a film winding mechanism for moving a film strip across said body, a shutter and actuating mechanism therefor, a single means mounted on said body and normally adapted to alternately lock said mechanisms so that one of said mechanisms can not be operated a second time prior to the operation of the other of said mechanisms to prevent the inadvertent making of a double exposure or the winding up of an unexposed portion of said strip, means controlled by the movement of said strip for actuating said means to move the latter into locking engagement with said winding mechanism and to release said actuating mechanism at the completion of the winding operation, means on said actuating mechanism for operating said first means to release said winding mechanism and to simultaneously lock said actuating mechanism upon operation of the latter, and means independent of said last two means for operating said first means to release said actuating mechanism subsequent to one operation thereof and prior to the operation of said winding mechanism to permit a second actuation of said shutter mechanism to make a double exposure on said strip.

5. In a roll film camera, the combination with a camera body, of a film winding mechanism for moving a film strip across said body, a shutter and actuating mechanism therefor, a lever slidably mounted on said body and movable in opposite directions to alternately lock said mechanisms, means controlled by said winding mechanism for moving said lever in one direction to lock said winding mechanism and to simultaneously release said actuating mechanism when an unexposed position of said film strip has been moved into exposing position, means on said actuating mechanism adapted to engage said lever when said actuating mechanism is operated for moving said lever in another direction to move said lever out of locking engagement with said winding mechanism and to simultaneously move said lever into locking engagement with said actuating mechanism, and means independent of said mechanisms for moving said lever in said one direction to release said actuating mechanism prior to the operating of said winding mechanism to permit a second operation of said actuating mechanism.

6. In a roll film camera the combination with a camera body, of a film winding mechanism for moving a film strip across said body, a shutter and actuating mechanism therefor, a lever pivotally and slidably mounted on said body and arranged to alternately lock said winding and actuating mechanisms, means for pivoting said lever to move the latter into locking engagement with said winding mechanism and to slide said lever in one direction to release said actuating mechanism, means controlled by the operation of said actuating means for pivoting said lever to move the latter out of locking engagement with said winding mechanism, means for then sliding said lever in the opposite direction to move said lever into locking engagement with said actuating mechanism, and means independent of said first mentioned means for sliding said lever in said one direction to again release said actuating mechanism.

7. In a roll film camera, the combination with a camera body, of a film winding mechanism for moving a film strip across said body, a shutter and actuating mechanism therefor, a lever pivotally and slidably mounted on said body, a ratchet operatively connected to said winding mechanism, a pawl on said lever adapted to engage said ratchet to lock said winding mechanism, film measuring means for controlling the engagement of said pawl with said ratchet so that such engagement occurs substantially at the completion of the film moving operation, a lug on said lever positionable in the path of said actuating mechanism to prevent operation thereof, means on said measuring means for engaging said lever upon engagement of said pawl with said ratchet to slide said lever in one direction to move said lug out of the path of said actuating mechanism, cooperating members on said lever and said actuating mechanism whereby the operation of the latter will move said pawl out of engagement with said ratchet to release winding mechanism, and a spring for sliding said lever in the opposite direction upon release of said winding mechanism to move said lug into the path of said actuating mechanism to lock the latter, and means independent of said measuring means for sliding said lever in said one direction to move said lug out of the path of said actuating mechanism.

8. In a roll film camera, the combination with a camera body, of a film winding mechanism for moving a film strip across said body, a shutter and actuating mechanism therefor, a lever pivotally and slidably mounted on said body; a ratchet operatively connected to said winding mechanism, a pawl on said lever adapted to engage said ratchet to lock said winding mechanism, a spring mounted on said body and engaging said lever and tending to move the pawl into engagement with said ratchet, a film measuring roll, a member controlled by said measuring roll for positively holding said pawl out of engagement with said ratchet until said winding mechanism has been operated to move an unexposed porton of the film strip into exposing position, a lug on said lever positionable in the path of said actuating mechanism to prevent the operation thereof, means on said member adapted to engage said lever subsequent to the engagement of said pawl with said ratchet to slide said lever in one direction to move said lug out of the path of said actuating mechanism, means for limiting the sliding of said lever to lock said winding mechanism against further operation, a cam on said lever positionable in the path of said actuating mechanism when said lever is slid in said one direction, the operation of said actuating mechanism serving to bring the latter into engagement with said cam to pivot said lever to move said pawl out of engagement with said ratchet, said spring then sliding said lever in the opposite direction to again position said lug in the path of said actuating mechanism and for simultaneously moving said pawl to a position in which said member will prevent engagement between said pawl and ratchet, and a manual control independent of said member for sliding said lever in said one direction to move said lug out of the path of said actuating mechanism prior to the operation of the winding mechanism to permit a second operation of the actuating mechanism to make a double exposure.

9. In a roll film camera, the combination with a camera body, of a film winding mechanism for moving a film strip across said body, a shutter and an actuating member therefor, a lever pivotally and slidably mounted on said body, a ratchet operatively connected to said winding mechanism, a pawl on said lever adapted to engage said ratchet to lock said winding mechanism, a spring mounted on said body and engaging said lever and tending to move the pawl into engagement with said ratchet, a film measuring roll, an annular ring mounted concentrically with said ratchet and operatively connected to said measuring roll so as to be actuated in timed relation to the movement of the film strip, said ring being formed with a radial slot adapted to be brought into registry with said pawl when said strip has been moved a distance sufficient to bring an unexposed film portion into exposing position, said spring then moving said pawl inwardly through said registering slot and into engagement with said ratchet, said roll moving said ring to bring an edge of said slot into engagement with said pawl to slide said lever in one direction, a pin and slot connection between said body and lever for limiting the sliding movement of said lever and for locking said winding mechanism against further movement, a lug on said lever positioned in the path of said actuating member and movable out of said path when said lever is slid in said one direction, a cam on said lever adjacent said lug and movable into the path of said actuating mechanism when said lever is slid in said one direction, a portion of said actuating mechanism arranged to engage said cam when said actuating mechanism is operated to pivot said lever to move said pawl outwardly through said slot and out of engagement with said ratchet, said spring then sliding said lever in the opposite direction to position said lug in the path of said actuating mechanism and to simultaneously move said pawl out of registry with said slot and to position said pawl on the outer surface of said ring, and a manual control lug formed on said lever and extending through said body and arranged to be actuated to slide said lever in said one direction to bring said pawl into registry with said slot and to simultaneously move said lug out of the path of said actuating mechanism without operating said winding mechanism to permit a second operation of said actuating mechanism.

10. In a roll film camera, the combination with a camera body of a film winding mechanism including a winding spindle for moving a film strip across said camera, a ratchet carried by said spindle, a ring loosely mounted on said spindle concentrically with said ratchet and formed with a radial slot, a film measuring roll, means for connecting said roll to said ring so that the latter will be operated and controlled in time relation to the movement of said strip, a lever mounted for longitudinal and pivotal movement on said body, a pawl formed on one end of said lever, said slot being arranged to be positioned in registry with said pawl substantially at the completion of the film moving operation, a spring mounted on said body and engaging said lever to pivot the latter to move said pawl inwardly through said slot and into engagement with said ratchet, a shutter trigger mounted on said body, a shoulder on said trigger, a lug formed on the other end of said lever and positioned under said shoulder to prevent operation of said trigger, said mechanism being capable of slight rotative movement subsequent to the engagement of said pawl with said ratchet to bring an edge of said slot into engagement with said pawl to slide said lever longitudinally in one direction to disengage said lug from said shoulder, means for limiting the movement of said lever to effectively lock the winding mechanism against further movement, cooperating cam members on said lever and said trigger so that the operation of the latter serves to pivot said lever to move said pawl outwardly through said slot and out of engagement with said ratchet, said spring then sliding said lever in the opposite direction to move said pawl out of registry with said slot and to simultaneously move said lug under said shoulder to lock said trigger, and a finger piece formed on said lever and extending through a slot in said body for moving said lever in said one direction independently of and without operation of the winding mechanism to move said pawl into locking engagement with said ratchet and to move said lug from in under said shoulder to free said trigger so that the latter may be actuated a second time prior to any movement of the film strip to permit the making of double exposure.

CARTER J. HUGHEY.